Oct. 16, 1951   C. W. PRIBUS   2,571,756
TOGGLE DRIVEN PHOTOGRAPHIC SHUTTER
Filed June 10, 1949   2 SHEETS—SHEET 1
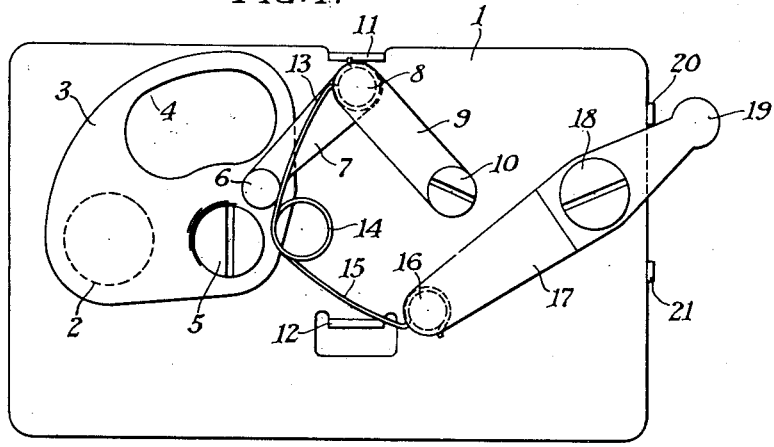
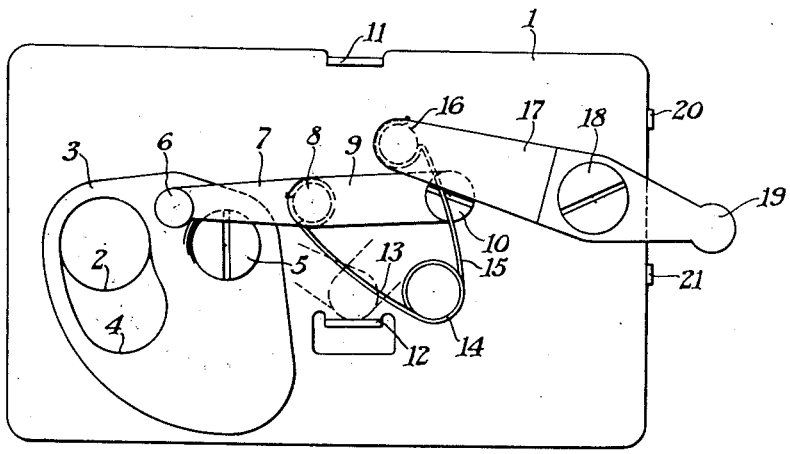
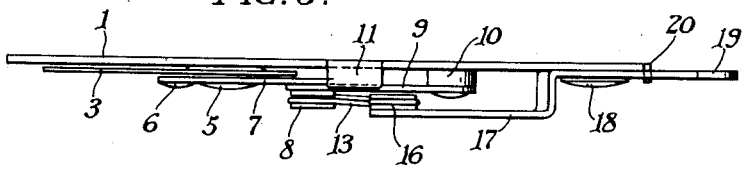
CLARENCE W. PRIBUS
INVENTOR
BY
ATTORNEYS

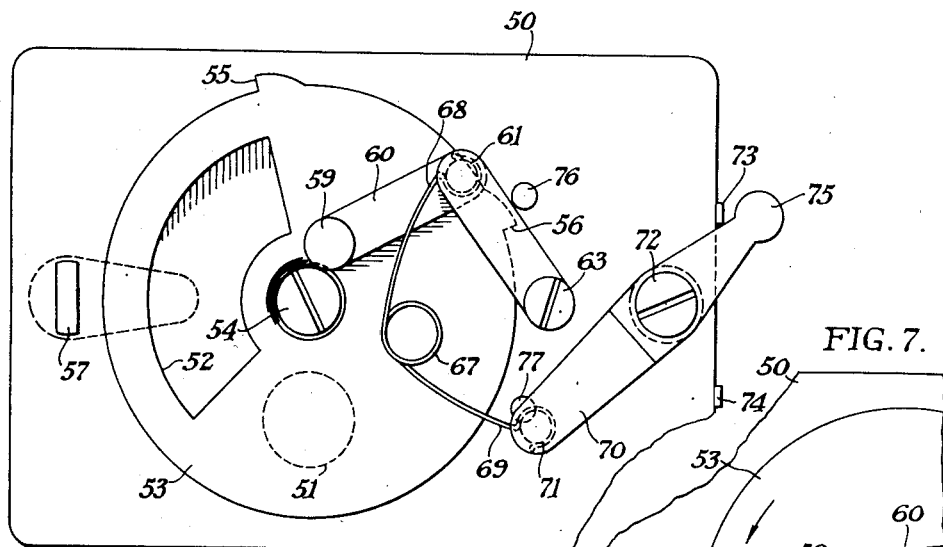
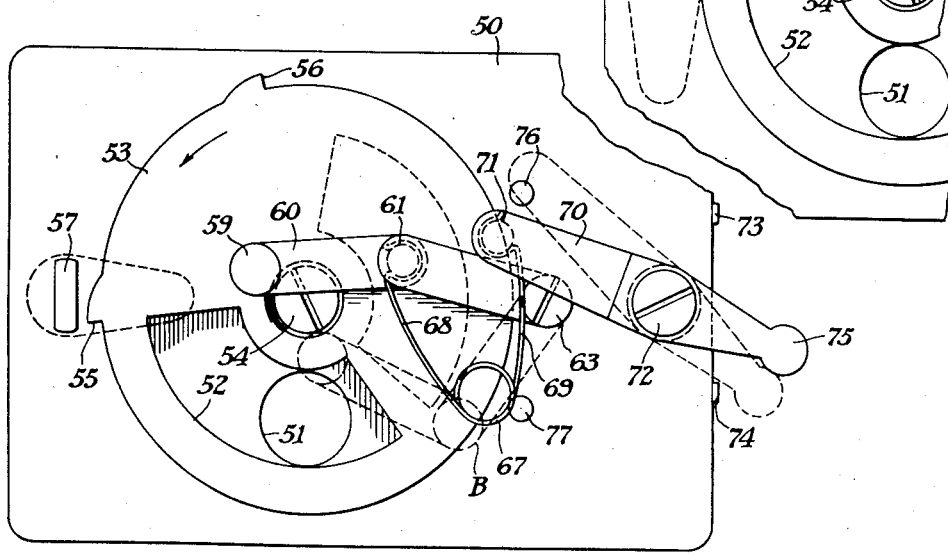
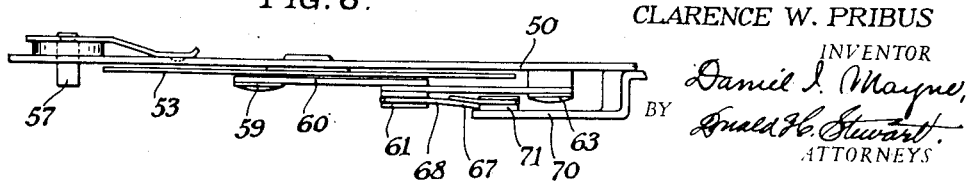
CLARENCE W. PRIBUS
INVENTOR

Patented Oct. 16, 1951

2,571,756

UNITED STATES PATENT OFFICE 2,571,756

TOGGLE DRIVEN PHOTOGRAPHIC SHUTTER

Clarence W. Pribus, Rochester, N. Y., assignor to Eastman Kodak Company, Rochester, N. Y., a corporation of New Jersey Application June 10, 1949, Serial No. 98,313

4 Claims. (Cl. 95—59)

This invention relates to photography and particularly to photographic shutters. One object of my invention is to provide an inexpensive shutter which is highly efficient. Another object of my invention is to provide a simple disk type of shutter which may be swung past, or oscillated over, an exposure aperture in such a manner that the speed of the shutter blade is lowered when the exposure aperture is open. A still further object of my invention is to provide a simple type of shutter which is adapted for use adjacent a camera objective, or where small film is used, which is adapted for use adjacent an exposure plane. Other objects will appear from the following specification, the novel features being particularly pointed out in the claims at the end thereof.

Coming now to the drawings wherein like reference characters denote like parts throughout:

Fig. 1 is a rear elevation of a camera shutter constructed in accordance with and embodying a preferred form of my invention;

Fig. 2 is a view similar to Fig. 1 but with the shutter parts in an exposure-making position;

Fig. 3 is a top plan view of the shutter shown in the preceding figures;

Fig. 4 is a rear elevation of a shutter constructed in accordance with a second embodiment of my invention;

Fig. 5 is a view similar to Fig. 4 but with the shutter parts shown in an exposing position;

Fig. 6 is a section taken on line 6—6 of Fig. 5; and

Fig. 7 is a fragmentary view showing the shutter held open for a prolonged exposure.

In most simple shutters where a pivoted shutter blade is employed, this shutter blade is moved, by means of a spring, continuously while an exposure slot crosses an exposure aperture, and the shutter blade usually starts moving rather slowly and gradually accelerates throughout its exposure-making movement. I have endeavored to provide a shutter in which the speed of the shutter blade is very materially reduced when the exposure aperture is opened, and in which the shutter blade moves with considerable rapidity during the opening and closing movement, thereby increasing the efficiency of the shutter over the usual type shutters. I have been able to obtain an efficiency of 75 to 80 per cent in a shutter constructed in accordance with my invention where the total exposure is in the neighborhood of 1/50 of a second. This is considerably higher efficiency than the usual type of inexpensive disk shutter.

My invention broadly consists in driving a pivoted shutter blade through a toggle comprising a pair of links which normally lie at an angle to each other as, for instance, approximately 90° when the shutter is at rest. This toggle is straightened out so that the links may lie in approximately a straight line while the shutter opening is over the exposure opening, so that the shutter moves very slowly during the period that the links just approach and just leave the straight line position, and so that the shutter blade accelerates rapidly when the links reach their maximum angular position. I preferably drive the toggle by means of a spring directly connected to a shutter trigger, and this spring is preferably of the so-called "hairpin" variety.

More specifically, referring to Figs. 1 to 3 inclusive, a typical example of my invention is shown in which the shutter consists of a support 1 having an exposure aperture 2. A shutter blade 3 is slotted at 4 and is mounted on a stud or pivot 5 on the plate 1 in such a position that the slot 4 may be swung back and forth over the exposure aperture 2 in making an exposure. A stud 6 carries one end of a link 7 which is pivoted by a stud 8 to a second link 9 which may turn upon a stud 10 carried by the support. The links 7 and 9 form a toggle and the plate 1 is formed upwardly at 11 and 12 to form stops for the toggle, limiting its outward motion in both directions.

One end 13 of a spring encircles the stud 8, there preferably being a coil 14 in the center of this spring and the opposite end 15 of the spring encircling a pin 16 carried by a trigger 17. This trigger is pivotally attached to the support 1 by a stud 18 and includes an operating handle 19 which may be moved between the two upstanding lugs 20 and 21 to compress and release the hairpin spring to move the toggle.

When the toggle is moved by the spring, the toggle levers 7 and 9 move from their maximum angular position in which they lie at approximately 90°, as shown in Fig. 1, to straighten out the links 7 and 9, as shown in Fig. 2, so that they rock the shutter blade 3 rapidly until the slot 4 lies over the exposure aperture 3 in which position an exposure is made. The toggle links then pass a straight line position and move through the straight line toward the bottom stop 12, again reaching an angular position, and, as this angular position is reached, the shutter blade 3 is accelerated quickly to rock back again and into its Fig. 1 position. However, the toggle links 7 and 9 do not lie in the Fig. 1 position after the first exposure, since the stud 8 lies against the stop 12. The trigger 19 likewise lies against the stop 21. The next exposure therefore requires that the trigger be moved in an opposite direction. Thus, in this embodiment of my invention the shutter blade 3 is rocked rapidly until the slot 4 crosses the exposure aperture 2, at which time the shutter slows down very materially, reverses its direction of movement and quickly returns to its Fig. 1 position. This entire movement preferably takes place in approximately $\frac{1}{50}$ of a second with the present embodiment, since this exposure is best suited to the present film speeds for use in simple cameras.

It is understood, of course, that the support 1, in the present instance, may be inserted in any known type of camera so that the exposure aperture 2 either lies adjacent the objective, or if the shutter is used for a small film camera, as, for instance, 20 mm. square, the exposure aperture may lie adjacent the film plane. It should be noted that when the parts lie at rest, the pivotal points 6, 10, and 18 lie in a straight line, and the stud 16 is swung through this straight line past a dead center position to tension and release the driving spring for moving the toggle links 7 and 9. It may also be noted that, in the present instance, the toggle is driven through the pivot 8, connecting links 7 and 9, but, if desired, this may be varied by engaging the upper end of the spring 13 with a stud arranged in a somewhat different position on one of the toggle links, although by doing this the mechanical advantage of a spring over the toggle is not so great. However, this may be useful if a somewhat more powerful spring is desired, or if it is desired to drive the toggle at a somewhat slower speed.

In the second embodiment of my invention, illustrated in Figs. 4 to 6 inclusive, the same general toggle operating mechanism is employed but the shutter action is different. In accordance with this embodiment of my invention, the shutter blade does not oscillate over the aperture, rocking in one direction to open and in the second to close, but the exposure slot is swung completely across the exposure opening, moving in a single direction as each exposure is made. The shutter blade, like the toggle links and trigger, move in one direction for one exposure and in a reverse direction for the next exposure.

Referring to Fig. 4, there is a support 50 which has an exposure aperture 51, this aperture lying in the path of a slot 52 carried by a shutter plate 53 mounted on the stud 54. The shutter plate includes two stops 55 and 56, either of which may be engaged by a time lug 57 which may be swung from its inoperative position of Fig. 1 to its operative position of Fig. 7 if a time exposure is desired.

In this instance, the shutter plate 53 is in the form of a disk. It carries a stud 59 on which a link 60 is pivotally supported; this link, in turn, being pivotally attached at 61 to a second link 62 pivotally supported at 63 by the support 50. Links 60 and 62 constitute a toggle for driving the shutter when a hairpin spring 67, having one end 68 attached to the toggle and the other end 69 attached to a trigger 70, is tensioned and released. The trigger 70 carries a stud 71 engaged by spring end 69. It is supported on a stud 72 carried by the supporting plate 50 and it moves between stops 73 and 74 preferably bent from the supporting plate 50. An operating handle 75 extends outwardly to be operated manually.

The support 50 also carries a pair of stop pins 76 and 77 which limit the movement of toggle link 62.

The operation of this shutter is much like that of the first embodiment in that with the parts in the position of Fig. 4, the trigger handle 75 is moved in the direction shown by the arrow. This tensions and releases the spring 67, causing the toggle links 60 and 62 to straighten out. However, as they approach a straight line position, as shown in Fig. 5, the stud 59 has moved past the shutter plate pivot 54 and, consequently, as the toggle links 60 and 62 fully straighten out and continue on to the position shown in broken lines "B" in Fig. 5, the shutter momentarily slows up, and actually pauses, and again turns in the same direction until the toggle link 62 strikes the stop pin 77. The shutter plate 53 will continue moving, of course, until the slot is in the dotted line position shown at "B," and in this position the shutter is ready for another actuation in which the trigger handle 75, the toggle links 60 and 62, and the shutter plate 53 all move in an opposite direction in making the next exposure.

As in the first embodiment of my invention, the hairpin spring is tensioned and released to drive the toggle mechanism, and, as in the first embodiment of my invention, the speed of the shutter decelerates as the toggle links straighten out, and accelerates during the first and last part of the toggle movement as the toggle links approach and recede from their straight line position. Thus, the toggle mechanism forms a simple means of driving the shutter blade to cause the slot to swing over the exposure aperture moving in one direction to open the aperture, and in a reverse direction to close the exposure aperture; or, to swing in one direction only in opening and closing the exposure aperture. In both cases, the speed of movement of the shutter blade reaches the slowest point while the exposure aperture is uncovered and moves more rapidly in both starting to uncover and starting to cover up the exposure aperture. I am therefore able to obtain unusual efficiency in an extremely inexpensive shutter.

It will thus be seen that I have provided two embodiments of a shutter with which the various objects of the invention can readily be achieved, and which are well adapted to meet conditions of practical use.

As various possible embodiments may readily be made, and as various changes may be made in the embodiments set forth, it is to be understood that all the matter herein set forth, or shown in the accompanying drawings, is to be interpreted as illustrative only and not in a limiting sense.

Having thus described my invention, what I claim is new and desire to secure by Letters Patent of the United States is:

1. A shutter comprising an apertured support, a slotted shutter blade pivotally mounted on the support and overlying the aperture, the slot being adapted to permit light to enter the aperture to make an exposure, a shutter trigger mounted on the support, a pivot for the trigger spaced from the shutter blade pivot and the periphery of the shutter blade, a toggle comprising a pair of levers pivoted together, one lever being pivotally mounted on the support beyond the shutter blade and between the pivotal supports of the shutter blade and the trigger, said trigger being adapted to swing over the toggle pivot on the support when the trigger is moved, a pivot carried by the shutter blade and located radially from the pivotal support of the shutter blade a distance to permit the toggle levers to straighten out as an exposure is made, said toggle levers having a rest position in which the levers lie at an angle to each other when the shutter blade covers the aperture, a spring connecting the trigger and a stud carried by a toggle lever spaced from the pivotal support for the toggle on the support whereby movement of the trigger over the toggle lever pivot and past the spring-carrying stud on the toggle lever carried by the support may tension and release the spring causing the toggle levers to move from a rest position to an exposure-making position in which the toggle levers are straightened out to a rest position in which the toggle levers lie at an angle to each other and in which the aperture in the support is closed by the shutter.

2. A shutter comprising an apertured support, a slotted shutter pivotally mounted for movement to move the slot over the aperture for exposure, a pivot on the shutter blade radially of the pivotal support for the shutter, a pivot on the support, a pair of pivoted toggle levers, one pivoted on the pivot carried by the shutter and the other pivoted upon the pivot carried by the support, the pivotal support for the shutter and the pivots on the shutter and on the support for the toggle levers being positioned so that when the shutter slot lies over the aperture the toggle links are straightened out and when the aperture is covered the toggle links are angularly disposed, a trigger, a stud carried by the trigger and movable between the toggle pivot carried by the support and a pivot carried by a toggle, said stud and last-named pivot carrying opposite ends of a hairpin spring to compress and release said spring when the trigger moves one end of the spring across the toggle pivot on the support and between a dead-center position between the toggle pivot on the support and the pivot carried by toggle lever whereby the toggle levers may straighten out in moving under the impulse of the spring to make an exposure and may move to an angular rest position as they move the shutter to an aperture-covering position; the angular rest position at an end of the exposure being at the opposite side of the support for the angle of rest position of toggle levers before the start of an exposure whereby each successive movement of the trigger to make an exposure may be in an opposite direction.

3. A shutter comprising an apertured support, a slotted shutter blade pivotally mounted on the support and overlying the aperture, the slot being adapted to permit light to enter the aperture to make an exposure, a shutter trigger mounted on the support, a pivot for the trigger spaced from the shutter blade pivot and the periphery of the shutter blade, a toggle comprising a pair of levers pivoted together, one lever being pivotally mounted on the support beyond the shutter blade and between the pivotal supports of the shutter blade and the trigger, said trigger being adapted to swing over the toggle pivot on the support when the trigger is moved, a pivot carried by the shutter blade and located radially from the pivotal support of the shutter blade a distance to permit the toggle levers to straighten out as an exposure is made, said toggle levers having a rest position in which the levers lie at an angle to each other when the shutter blade covers the aperture, a spring connecting the trigger and a stud carried by a toggle lever spaced from the pivotal support for the toggle on the support whereby movement of the trigger over the toggle lever pivot and past the spring carrying stud on the toggle lever carried by the support may tension and release the spring causing the toggle levers to move from a rest position to an exposure-making position in which the toggle levers are straightened out to a rest position in which the toggle levers lie at an angle to each other and in which the aperture in the support is closed by the shutter, the toggle levers when straightened out as the shutter moves to an exposure-making position being of insufficient length to swing over the shutter pivot whereby the shutter blade may swing in one direction to an exposure-making position and may swing back into the same rest position from which the shutter blade moved in making an exposure, as the toggle levers again move at an angle to each other.

4. A shutter comprising an apertured support, a slotted shutter blade pivotally mounted on the support and overlying the aperture, the slot being adapted to permit light to enter the aperture to make an exposure, a shutter trigger mounted on the support, a pivot for the trigger spaced from the shutter blade pivot and the periphery of the shutter blade, a toggle comprising a pair of levers pivoted together, one lever being pivotally mounted on the support beyond the shutter blade and between the pivotal supports of the shutter blade and the trigger, said trigger being adapted to swing over the toggle pivot on the support when the trigger is moved, a pivot carried by the shutter blade and located radially from the pivotal support of the shutter blade a distance to permit the toggle levers to straighten out as an exposure is made, said toggle levers having a rest position in which the levers lie at an angle to each other when the shutter blade covers the aperture, a spring connecting the trigger and a stud carried by a toggle lever spaced from the pivotal support for the toggle on the support whereby movement of the trigger over the toggle lever pivot and past the spring-carrying stud on the toggle lever carried by the support may tension and release the spring causing the toggle levers to move from a rest position to an exposure-making position in which the toggle levers are straightened out to a rest position in which the toggle levers lie at an angle to each other and in which the aperture in the support is closed by the shutter, the toggle levers being of a length to pass over the shutter pivot when the toggle levers move from a rest position at an angle to each other on one side of the support, through a straightened-out, exposure-making position and to a second rest position in which the toggle levers lie at an angle to each other and over the other side of the support.

CLARENCE W. PRIBUS.

REFERENCES CITED

The following references are of record in the file of this patent:

UNITED STATES PATENTS

| Number | Name | Date |
|---|---|---|
| 582,219 | Mosher | May 11, 1897 |
| 703,893 | Bruck | July 1, 1902 |
| 2,153,153 | Nelson | Apr. 4, 1939 |